United States Patent [19]
Fond et al.

[11] Patent Number: 5,826,492
[45] Date of Patent: *Oct. 27, 1998

[54] APPARATUS FOR EXTRACTING A SUBSTANCE CONTAINED IN A SACHET

[75] Inventors: Olivier Fond, Yverdon; Gérard Lavanchy, Prilly; Jean-Pierre Pleisch; Jacques Schaeffer, both of Chardonne; Alfred Yoakim, La Tour-de-Peilz, all of Switzerland

[73] Assignee: Nestec S.A., Vevey, Switzerland

[ * ] Notice: The term of this patent shall not extend beyond the expiration date of Pat. No. 5,649,472.

[21] Appl. No.: 608,662

[22] Filed: Feb. 29, 1996

Related U.S. Application Data

[63] Continuation of Ser. No. 178,325, Jan. 11, 1994, Pat. No. 5,649,472.

[30] Foreign Application Priority Data

Jul. 20, 1992 [EP] European Pat. Off. ............... 92112364

[51] Int. Cl.$^6$ ...................................... A47J 31/00
[52] U.S. Cl. ............................. 99/295; 99/302 R; 99/307; 99/316
[58] Field of Search .................... 99/295, 302 R, 99/307, 316

[56] References Cited

U.S. PATENT DOCUMENTS

| | | | |
|---|---|---|---|
| 3,209,676 | 10/1965 | Zimmermann et al. | 99/295 |
| 3,295,998 | 1/1967 | Goros . | |
| 3,403,617 | 10/1968 | Lampe . | |
| 3,407,812 | 10/1968 | Levinson . | |
| 3,607,297 | 9/1971 | Fasano . | |
| 4,429,623 | 2/1984 | Illy . | |
| 4,806,375 | 2/1989 | Favre . | |
| 4,846,052 | 7/1989 | Favre et al. . | |
| 5,012,629 | 5/1991 | Behman et al. . | |
| 5,327,815 | 7/1994 | Fond et al. | 99/295 |
| 5,343,799 | 9/1994 | Fond . | |
| 5,398,595 | 3/1995 | Fond et al. . | |
| 5,398,596 | 3/1995 | Fond . | |
| 5,472,719 | 12/1995 | Favre | 99/295 |

FOREIGN PATENT DOCUMENTS

| | | |
|---|---|---|
| 6174 | 1/1980 | European Pat. Off. . |
| 0272432 | 6/1988 | European Pat. Off. . |
| 636311 | 5/1983 | Switzerland . |

OTHER PUBLICATIONS

Fond, et al., U.S.S.N. 07/880,173 (effective 1992) to be issued as U.S. Patent No. 5,402,707 on Apr. 4, 1995.

*Primary Examiner*—Anthony J. Weier

[57] ABSTRACT

An apparatus for extracting a substance contained in a sachet for preparation of a beverage has a first member having raised and hollow portions for forming a flow zone and a second member for cooperating with the first member to form a chamber to contain the sachet for extraction of the substance and to grip the edge of the sachet to ensure fluid-tightness upon being tightened, each member being configured for forming substantially half of the chamber for containing and ensuring a specific sachet shape. In one embodiment, the second member has provision for perforating an upper surface of a sachet for introducing water into the sachet. In another embodiment, the first member has an injector member which projects beyond the raised portions for perforating and introducing water into the sachet. The first and second members may be mounted on a chassis so that the members are mounted about an axis so that upon movement about the axis, the members are brought together so that they form the chamber, and a rim of the first member and an edge of the second member cooperate for gripping an edge of a sachet.

17 Claims, 7 Drawing Sheets

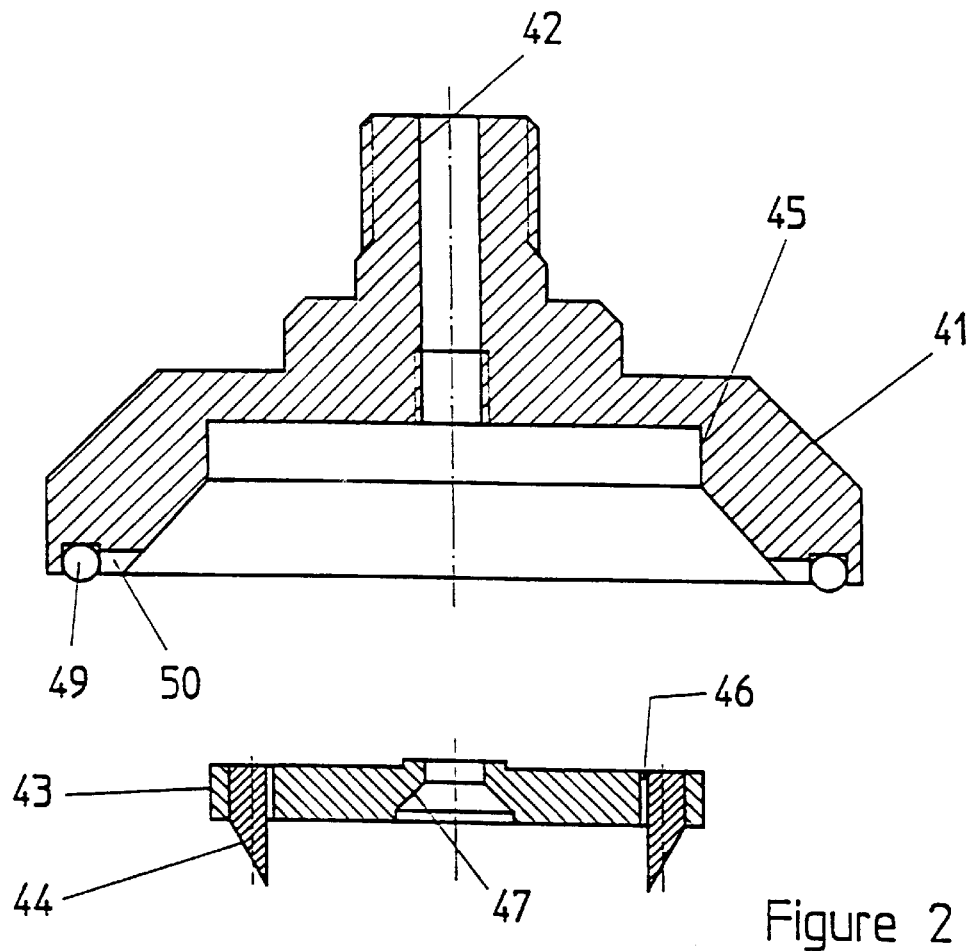
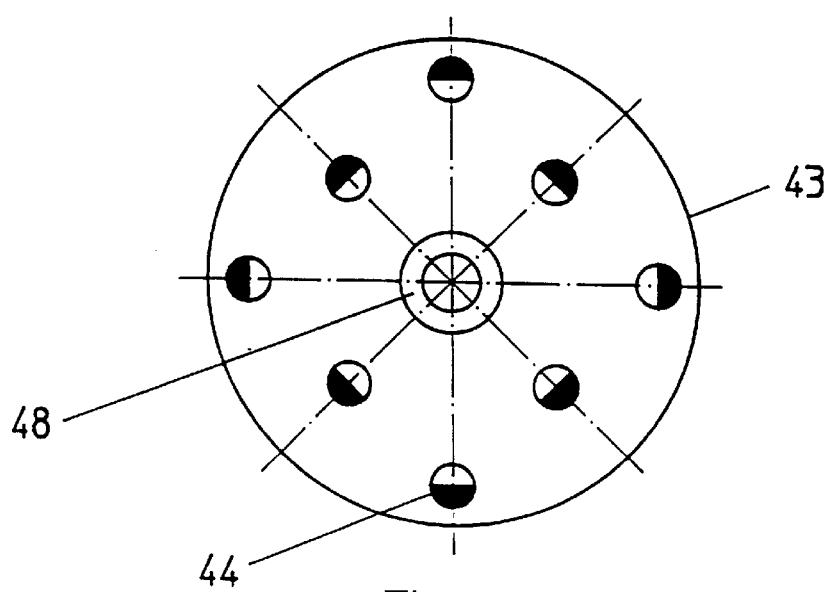
Figure 2
Figure 3 under the extraction of the
APPARATUS FOR EXTRACTING A SUBSTANCE CONTAINED IN A SACHET

CROSS REFERENCE TO RELATED APPLICATION

This is a continuation application of application Ser. No. 08/178,325, filed Jan. 11, 1994, now U.S. Pat. No. 5,649,472.

BACKGROUND OF THE INVENTION

The invention relates to apparatus for extraction of sealed flexible sachets containing at least one substance for the preparation of a beverage.

The use of pre-metered and pre-packaged portions of ground coffee for the preparation of expresso-type coffee has the advantage that it facilitates the operations to prepare the coffee while ensuring that the quality of the product is relatively consistent.

These portions are currently provided in two main forms.

According to a first general form, the portions disclosed in Swiss Patent No.-636 311, U.S. Pat. No. 5,012,629 and European Patent Application Publication No.-0 272 432 are formed by two sheets of filter paper sealed over their periphery and filled with ground coffee. This solution has the drawback that an oxygen-barrier outer packaging is required to prevent the oxidation of the product during storage. This outer packaging entails additional costs and a supplementary operation for the consumer who has to remove it before the desired coffee can be extracted.

According to a second form, disclosed in Application PCT/CH91/00 222, the portion is formed by a leak-tight capsule with a concave base opening into its extraction device by deformation under the action of the introduction of the extraction fluid, then perforation against pointed members. This capsule, formed by a leak-tight envelope forming a lateral wall and two walls, one of which forms the base of the cartridge and the other of which closes the opposite end of the cartridge, has the drawback that it makes simultaneous use of several different packaging materials, at least one of which has to be thick enough to make it semi-rigid. It can be used only in one direction with an extraction device which is completely adapted to the capsule and to its arrangement. Moreover, it is relatively bulky as the coffee is not compacted.

SUMMARY OF THE INVENTION

The object of the present invention is to provide a method and apparatus for allowing extraction of a substance for preparation of a beverage contained in a sealed flexible sachet without prior opening, the method entailing no particular requirements as regards the positioning of the upper and lower surfaces of the sachet.

Accordingly, the present invention provides an apparatus for the extraction which comprises a first, or lower, member having raised and hollow portions forming a flow zone and comprises a second, or upper member, each member forming, for extraction of the substance contained in the sachet, substantially half of a chamber for containing and ensuring a specific shape of the sachet, which is not necessarily identical to its initial shape, and the members cooperate to grip the edge of the sachet to ensure fluid-tightness. Tightening is ensured by auxiliary fastening means which make the first and second members rigid with one another. The second member may include means adapted to perforate the upper surface of the sachet and allow the introduction of water into the sachet. Alternatively, the first member may include a water injector member which projects beyond that of the raised portions for introduction of water into the sachet.

The present invention also provides a method in which the sachet is positioned and held in the extraction apparatus which is formed by a closed chamber comprising a sachet holder, a mixture of air and water at a pressure of between 2 and 20 bar is introduced into the sachet by means of an inlet member in order, progressively and locally, to stretch the extraction surface of the sachet against a raised surface of the sachet holder comprising raised and hollow portions, the extraction surface being torn at multiple locations in accordance with a pattern predetermined by the location of the raised and/or hollow portions, there achieving its breaking tension in order to allow the flow of the liquid after extraction.

A sachet package employed in accordance with the present invention is formed from two thin flexible sheets of the same material sealed over their periphery and substantially symmetrical to one another with respect to the plane of sealing. The substance may be in the form of powder or is compacted into a cake of appropriate shape in one or a plurality of pieces.

The method and use of the apparatus are also characterized by the high value of the extraction pressure, as its maximum value is not necessarily reached during the opening of the sachet, but may be reached later during extraction when the loss of load through the bed of coffee has reached its maximum.

DETAILED DESCRIPTION OF THE INVENTION

The description below, although applied to roast and ground coffee, is not limiting and is given by way of example, as the method can be applied to other products or mixtures of products contained in a flexible sachet such as tea, soluble coffee, chocolate or dehydrated foodstuffs adapted to provide drinks or foodstuffs in the form of infusions.

The method and use of the apparatus of the present invention are described further by description of successive stages of the method, which may be carried out, in the particular case of its use for coffee, using commercially available expresso machines comprising means, whether integral or through the addition of adapters, for perforating one of the surfaces of the sachet, introducing water therein, tearing the other surface in a controlled manner as a result of its deformation under the effect of pressure and collecting the coffee extract.

During a first stage, the sachet is positioned in the sachet holder, the lower surface becoming the extraction surface in this arrangement.

During a second stage, the sachet holder provided with the sachet is placed in the machine and the upper surface of the sachet is then perforated by the cutting or perforating member(s) disposed below the lower surface of the upper portion of the extraction chamber.

During this stage, the shape of the sachet may be modified at will with respect to its initial shape by adaptation to the configuration of the chamber of the extraction apparatus. The shape of the sachet is thus fully defined prior to extraction during its positioning, even after undergoing possible deformations resulting from prior handling, in particular when the sachet contains a product which is only slightly compacted or not compacted at all.

According to a variant of the method, the positioning operation entails a clamping effect which reduces the available inner volume of the sachet in order to limit those locations not filled by the substance to be extracted to a predetermined minimum. Depending on the method of production of the sachet, its initial volume may be greater than that of the substance which it contains if it is desired that this substance should be slightly compacted prior to extraction, as is the case with ground coffee. This adaptation of the available volume makes it possible to facilitate extraction; as the substance is uniformly disposed in the chamber, it is correctly traversed by the extraction fluid and when removed, moreover, the sachet is not impregnated with excess water, which facilitates the cleanliness and practicality of the method.

Moreover, the flexible upper surface of the sachet may, under the effect of the water pressure and the swelling of the coffee, be forced against the upper surface of the chamber, thereby improving the moistening of the coffee and the quality of its extraction.

According to a further variant of the method, auxiliary means provided below the upper surface of the extraction device and/or on the lower surface of this device make it possible to move the coffee in the sachet towards specific and preferred zones in order to facilitate the quality of the extraction by avoiding dead zones.

These means may consist in a particular geometrical shape of these surfaces.

In order to regularize extraction from a bed of substance, it is desirable that this bed is not too thin or of unequal thickness. In the case of a flexible sachet, these drawbacks would occur if the means described above were not used.

According to a variant of sachets containing coffee compacted during production, the volume of the chamber corresponds very closely to the size of the cake and the sachet in order to avoid free zones between the sachet and the cake and undesirable preferential paths during extraction.

During a third stage, the water, possibly mixed with air, is introduced into the sachet at a pressure of between 2 and 20 bar, preferably between 4 and 15 bar. The surfaces of the sachet are forced against the walls of the extraction chamber and the extraction surface is locally deformed by progressive stretching, under the effect of the pressure, against the raised portions of the sachet holder which is provided with discharge apertures for the infusion. This essential stage provides a period of premoistening of the coffee prior to extraction.

The air may be the air present in the ducts of the machine which is mixed with the water during the activation of the extraction process.

In certain conditions, depending on the expresso machines used and the initial heating temperature, the initial fractions of water may be in the form of steam.

According to a variant of the method, a pause, during which no further extraction liquid is introduced, may be provided between the third and fourth stages.

During a fourth stage, the material forming the extraction surface reaches its breaking tension as a result of being stretched and starts to tear at the location of the projecting raised portions or in the hollow portions formed between these raised portions. Depending on the shape of the raised portions, the tears may also extend into both zones mentioned above. The portions split in this way, without becoming detached from the extraction surface released from its tension, are applied against the raised portions with the result that the apertures formed become larger, facilitating the subsequent flow of the extraction liquid, but in such a way that there is no dispersion of material outside of the sachet. The inner pressure of the sachet drops partially, but this momentaneous decompression is limited, as the flow of fluid escaping from the sachet is laminated both by the small interstices formed by the lips of the torn material of the extraction surface applied against the raised portions and by the flow apertures provided in or in the vicinity of the raised portions. The flow is thus fully controlled, in particular preventing any undesirable movement of the solid phase of the content of the sachet which could obstruct the flow apertures and further impede the regularity and reproducibility of the extraction process.

According to the terminology used in Swiss Patent Specification No.-668 545 relating to a capsule with a pre-weakened cap, this stage of opening of the sachet can be considered as a stage of aeration of the powder material.

According to a variant of the method, a pause, during which no further extraction fluid is introduced, may be provided between the fourth and fifth stages.

During a fifth stage, the coffee is extracted at a pressure of 2 to 20 bar, this pressure being intentionally and essentially linked to the loss of load through the bed of moistened coffee which is compacted for this reason. This is the extraction stage.

Supplementary apertures in the extraction surface may be produced when necessary by raised portions of the sachet holder of decreasing height, provided preferably in its peripheral zone, when the extraction pressure reaches high values.

During a sixth stage, the sachet holder is released and the sachet is removed, for instance simply by upturning the sachet holder.

According to a variant of the system of a flanged type, described below, the sachet is removed manually by means of an insert or automatically into a suitable container at the end of the fifth stage.

According to a first variant of the method, the tears are produced in the central portion of the (hollow) cavities formed between the projecting portions of a raised member when the material reaches its breaking tension following deformation.

According to a second variant of the conduct of the method, the extraction surface of the sachet may start to tear at the raised portions, tearing extending into the centre of the (hollow) cavities formed by these portions.

According to a third variant of the method, the opening of the extraction surface takes place by obtaining the breaking tension at the location of the raised portions possibly associated with supplementary members which are not designed to tear the extraction surface of the sachet but to facilitate the flow, while ensuring the cleanliness of the system.

The coffee extract passes between the torn and deformed portions of the extraction surface of the sachet and reaches the flow apertures, as these torn portions cannot be forced in a completely leak-tight manner against the raised portions because of a certain relative rigidity due to their fairly small dimensions.

Some tens of tears are preferably produced in the extraction surface. In general, the geometry of the raised portions is arranged such that the torn portions are not completely detached but remain rigid with the sachet.

The sachet used for the application of the method of the invention may be of a type similar to that forming the subject matter of European Patent Application 92.111.422.9 filed on 6 Jul. 1992 by the applicants under the title "Sealed flexible sachet and its method of manufacture".

The inner diameter of the sachet is preferably between 25 and 70 mm and the sealed edge has a width of 3 to 15 mm. Once filled, the sachet preferably has a thickness of between 5 and 20 mm at its centre. In the case of coffee, the quantity which it contains may vary between 5 and 20 g of ground coffee possibly compacted into the form of a cake. The general shape of the sachet is circular, oval or polygonal with four to ten sides possibly with rounded edges, or may be a combination of these three elements.

After positioning in the machine, the extraction surface of the sachet is not necessarily disposed in a horizontal plane. Other orientations may be preferred for the ease of processes of use.

According to a particular arrangement of the extraction chamber of the device of the present invention, its inner volume is smaller than the initial volume of the sachet. This arrangement applies in particular to the extraction of non-compacted sachets.

According to a further particular arrangement of the extraction chamber, the upper member and/or the lower member have elements helping to move the substance to be extracted into specific and preferred zones in the interior of the sachet.

These elements may take the form of projections disposed on the lower surface of the upper member and/or of a particular geometry of the upper surface of the lower member of the extraction device, preferably circular, helical or in the form of portions of straight lines or arcs. This arrangement applies in particular to the extraction of non-compacted sachets.

According to a first variant of the device for introducing water, the means of the upper member adapted to perforate the upper surface of the sachet and introduce water therein may take the form of a water distribution grid provided on its lower surface with members such as projecting points, blades or crosses, for instance those disclosed in European Patent Application 91.111.211.8 filed on 5 Jul. 1991. The water throughput apertures do not necessarily coincide with these members but may advantageously be located on their periphery.

According to a second variant, one or a plurality of water injection needles may be provided and disposed to project into the chamber of the upper member, for instance of the type disclosed in European Patent Application 90.114.402.2 filed on 27 Jul. 1990. A needle of this type makes it possible to perforate the upper surface of the sachet when positioned in the complete device and to inject the fluid within the sachet.

The water injection needle(s) are designed with a tapered shape so that they perforate the material of the sachet with openings which are able to close again at least partially in order to minimize discharges when the sachet is removed. Moreover, they do not prevent the sachet from swelling and being forced against the neighbouring wall. The dimensions and arrangement of these water injection means are selected so as not to create undesirable preferential paths through the bed of coffee, but to wet it uniformly throughout its volume. The shape, dimension and arrangement of the needle(s) are adapted to the shape and dimensions of the sachet.

In the case of an arrangement comprising a plurality of water injection needles, it may be advantageous to mount these needles on a member able to move in rotation so as not to tear the sachet, this movement then being synchronized by entrainment during the insertion of the sachet holder.

According to a preferred variant of the upper member and its integral portion participating in tightening, these members may be an integral part of expresso machines specially designed for the extraction of such sachets.

According to a conventional arrangement of this variant, the tightening means integral with the upper member takes the known form of tightening flanges, preferably two to three, which are conventionally found in expresso machines with fastening devices of the bayonet type.

According to a particular embodiment, the lower detachable member causes the simultaneous rotation of the lower portion of the upper member comprising the water introduction means, thus preventing any risk of accidental tearing of the sachet when the water introduction means comprise a plurality of openings.

According to a variant of the upper member and its integral portion participating in tightening, these members may form part of a more overall detachable member which can be fitted to conventional commercially available expresso machines thus allowing the extraction of such sachets.

According to a first arrangement of this variant, the adaptation enabling the extraction of sachets is carried out using two components one of which may remain temporarily in place in the expresso machine. The first component, called an adapter, is fitted on the expresso machine for which it is produced, and the second component, called a sachet holder, is mounted on the first.

The first of these components, the adapter, comprises on its exterior, tightening lugs adapted to engage on the primary tightening flanges of the expresso machine. It also comprises, on its interior, secondary tightening flanges, a cavity and means adapted to perforate the upper surface of the sachet and introduce water. This first component may remain temporarily in place in the machine and be locked against rotation by means of a tightening screw.

The second component, the sachet holder, comprises clamping lugs adapted to engage on the secondary tightening flanges of the preceding component as well as a cavity and raised and hollow portions on a component comprising flow holes (lower member).

These two components are of the type of the invention disclosed in European Patent Application 91.111.212.6 filed on 5 Jul. 1991, but adapted specially for the extraction of flexible sachets, in particular as regards the shape of the cavity adapted to receive the sachet, the water introduction means and the flow member.

According to a second arrangement of this variant, the adaptation enabling the extraction of sachets is carried out using two components which have to be associated before the assembly can be placed in the expresso machine.

The upper component, placed or articulated on the lower component, comprises members adapted to the water distribution member of the expresso machine and designed to cooperate with the fluid-tight joint of this machine, a cavity and means adapted to perforate the upper surface of the sachet and inject water.

The lower component comprises tightening lugs adapted to engage on the tightening flanges of the expresso machine and raised and/or hollow members integral with a component acting as a flow grid. This component corresponds to the sachet holder. Operated by means of a handle, the assembly formed by the lower and upper components performs a rising or descending rotary movement once it is engaged in the tightening flanges of the expresso machine.

These two components are of the type of the invention disclosed in European Patent Application 91.111.211.8 filed on 5 Jul. 1991, but specially adapted for the extraction of flexible sachets, in particular as regards the provision of the chamber designed to receive the sachet.

According to a particular embodiment of the lower member of the extraction device and its fastening means, these members may be in the form of a sachet holder of the type of the cartridge holder disclosed in European Patent Application 92.107.548.7 filed on 5 May 1992 but adapted for the extraction of flexible sachets. The sachet holder may then incorporate the specific members disclosed in this prior application and in particular, as regards its fluid-tight device, the possible separation of the sachet holder and the sachet holder support with the possibility of rotation with respect to one another, the possibility of integrating one or two cones internally in order possibly to separate the flow of the extract and the reflux of substance once it has been extracted.

The lower portion of the chamber and the component comprising the raised portions are not necessarily integral.

The sachet holder may be in one piece, comprising the lower component and its support, including the tightening means, or in two pieces comprising the lower component (including the raised and hollow portions on a component enabling the flow) and the support for this component including the tightening means.

With particular reference to the fluid-tight device, according to a first arrangement, the lower outer surface of the upper member comprises a conical edge. A corresponding conical portion faces this edge on the periphery of the sachet holder. The two portions engage with one another gripping the edge of the sachet. The angles are preferably slightly different for each of the two cones, limiting the zone of theoretical contact to a narrow crown.

According to a second arrangement of the fluid-tight device, the lower portion of the upper member presses the rim of the sachet against an elastic O-ring disposed on the periphery of the sachet holder.

According to a preferred variant of the device, the member with raised and hollow portions and a fluid-tight cone comprises a rim whose lower portion is shaped as a convex spherical ring whose centre of curvature coincides with the axis perpendicular to the plane of the bearing surface of the sachet, this spherical rim bearing freely on a seat having a concave surface of the same curvature rigid with the lower member (sachet holder support) and preferably formed from a material with a low sliding coefficient. Consequently, the assembly forms a swivel joint assembly. It will be appreciated that the direction of the curvatures can be reversed.

According to a preferred variant, fluid-tightness takes place by means of a flexible joint, characterized in that it is disposed freely in a housing allowing it, under the pressure of the water disposed between the joint and the base of the housing, to push this joint and cause it to be crushed against the edge of the sachet. In this variant, the pressurized water pushing the joint vertically is supplied via the base of the housing.

According to a second configuration of this variant, the housing receiving the flexible joint has only a radial play. In this case, the water which deforms the joint is directly that contained in the extraction chamber.

In the two above configurations, the joint may be toric, cylindrical or any other known and commercially available shape.

According to a particular arrangement of the fluid-tight device, the upper and lower members comprise complementary members adapted to fit one another, making it possible to stretch the surfaces of the sachet during the tightening of the assembly (lower member against the upper member with the sachet disposed therebetween).

In the case where the sachet has, in the peripheral zone of both its surfaces, corrugations created during manufacture in order to compensate, without the appearance of random folds, the filling of the two plane sheets, the surfaces bounding the cavities of the upper and lower member of the extraction device and their edge ensuring sealing during extraction, may be raised in the form of corrugations compatible with those of the sachet.

A similar arrangement of the contact zone between the upper member and the lower member may be advantageously provided even when extracting flexible sachets whose periphery is plane. In this arrangement, the corrugations are, however, of small amplitude and are just sufficient to stretch the edge of the sachet in order to suppress any accidental folds.

The raised portions ensuring the opening of the extraction surface of the sachet are of the same type as the five types disclosed in European Patent Application 92.107.548.7 filed on 5 May 1992.

According to a first embodiment, the raised portions are formed by small rods which are rectilinear or slightly sinuous or in the form of closed or unclosed arcs having separate lengths and disposed in a radial, concentric, parallel or perpendicular manner on a grid perforated with a large number of small holes. They may have a semi-circular or approximately trapezoidal cross-section. Their width and height are from 0.5 to 7 mm.

According to a second embodiment, the raised portions may also take the form of small prisms, truncated pyramids, cylinders or truncated cones of circular or non-circular polygonal section.

According to a third embodiment, the bases of the raised portions have circular or ovoid cavities at the base of which the flow holes for the coffee are disposed. The depth of the cavities may range from 1 to 7 mm.

According to a variant of the three above-mentioned embodiments, the raised portions form a part disposed on a flow grid.

According to a further variant, the raised portions may be an integral part of a plate drilled with filtration holes for the flow of the extract.

According to a fourth embodiment (not shown), the relative arrangement of the raised portions and the flow holes is reversed. The raised portion is formed by a component comprising portions which are hollow with respect to the main surface and flow holes provided at least in the projecting portion. The material tears so as to expose the projecting portions provided with the holes.

According to a fifth embodiment, the raised portions are pyramidal members associated with complementary members which are not designed to tear the extraction surface of the cartridge but to facilitate the flow of the fluid extract while retaining the substance, for instance in the form of terraces with a width of 0.2 to 1 mm surrounding the pyramidal shapes and channels at the base with a width of approximately 0.7 to 2.5 mm and a depth of approximately 0.3 to 1.8 mm. These channels are drilled with a number of flow holes calibrated to a diameter of some tenths of a millimeter.

According to a first variant, the pyramidal shapes are formed by truncated pyramids with sides measuring 1 to 7 mm and a height of 1 to 7 mm, preferably disposed in a grid whose pitch is conventionally between 3 and 10 mm. The surfaces preferably have an angle of 10° to 30° to vertical.

The upper surface of the pyramids acts as a support surface when the sachet is subjected to the effect of pressure. Tearing commences at the peaks of these pyramids.

According to a second variant, the pyramidal shapes are formed by full and/or partial, i.e., asymmetrical, pyramids.

These asymmetrical pyramids may be obtained either with pyramids whose vertical surfaces do not all have the same angle or with pyramids which were originally symmetrical, from which vertical portions have been removed.

In this fifth embodiment, the surfaces of the raised portions and possibly the terraces and channels may have small furrows (channels) facilitating the evacuation of the extract, the material of the extraction surface of the sachet being rigid enough to prevent it from completely matching the shape of the furrow.

Several types of pyramid may co-exist in this fifth embodiment.

According to a sixth preferred embodiment, the height of the pyramids and the adjacent channels is not constant over the entire surface. A part thereof is adapted to cause the opening of the sachet only when a pressure higher than the conventional value is reached, thus correcting the extraction flow by increasing it. This effect is preferably obtained by decreasing the height of the pyramids and increasing the depth of the channels separating the terraces. Its objective is to regularize the flow from different sachets which could otherwise vary depending on the blend of coffee which they contain.

According to a variant of the above-mentioned shapes, the extraction may be limited to a preferably annular zone of the lower surface, in order to force the water to travel a maximum path through the bed of coffee when the water is introduced centrally. Reciprocally, the reverse configuration is possible.

In all the cases described above, the openings of the lower wall of the sachet are the result of deformation to breaking point, but only under the effect of and after pressurization by water or the extraction mixture of water and air.

Instead of disposing the sachet in the sachet holder which is then disposed in the machine, a device may be provided in which the sachet holder is an integral part of the machine in a system known as a jaw system, the sachet being inserted directly in the machine and the perforation of the upper portion of the sachet being carried out by the cutting or perforating members when the jaw is closed.

In this case, the upper member or the lower member may have either a movement of rotation about a horizontal or vertical axis, or a folding movement, or a drawer movement allowing this insertion. The two members are made integral during extraction by a system of hooks or any other appropriate device. The advantage of this solution is that at the moment of tightening or release, there is no rotary movement of the sachet thereby avoiding the use of rotary showers or pyramids.

A further advantage is that the tightening force prior to extraction may be higher by means of a gear reduction device. Moreover, with this system, it is possible to envisage an automatic ejection of the sachet after extraction into a tank provided for this purpose.

This arrangement also makes it possible to introduce water and extract coffee on the same side of the sachet, the water introduction member(s) and the raised portions preferably being concentric, the former in the centre and the latter on the periphery.

In a simplified version, the sachet is removed by means of a collar which may or may not be an integral part of the sachet holder. This collar may for instance have an annular shape and be inserted around the member comprising the raised portions. It can be moved by a spring for the ejection of the sachet or be withdrawn manually from the lower portion. In the absence of this collar, the use of a sachet provided with a lateral tongue is particularly advantageous.

It is evident to a person skilled in the art that the various variants mentioned above can be adapted to be integrated in an automatic mechanical device which, using known auxiliary means which are not therefore described in detail, carries out the positioning of the sachet, fluid-tightening and after infusion, the release and removal of the used sachet. The arrangement of the respective members may be modified with respect to that described above, the extraction surface being disposed, for instance, in a vertical or oblique plane. In this case, the water injection may or may not be perpendicular thereto.

It will be appreciated that the whole of the above description of the device of the invention relating to the raised portions, the flow member and the fluid-tight device of the sachet holder is also valid for the sachet holder without there being any need to repeat the description relating thereto.

In particular, the sachet holder may be in one or two pieces with raised and hollow portions with asymmetrical pyramids and corrugations on the periphery of the lower member.

The following description is made with reference to the accompanying drawings.

BRIEF DESCRIPTION OF THE INVENTION

FIG. 2 is an exploded sectional view of the upper member for the injection of water of this device.

FIG. 3 is a plan view of the various water injection points of FIG. 2.

DETAILED DESCRIPTION OF THE INVENTION

Figure 1:
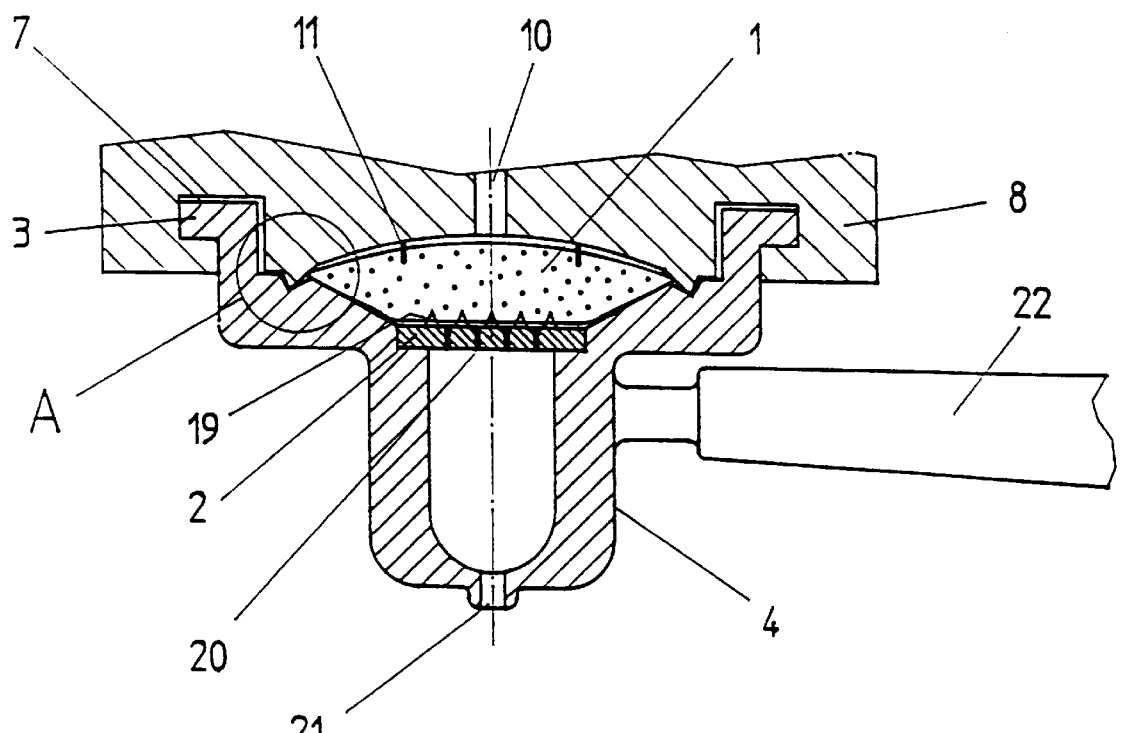
FIG. 1 is a diagrammatic representation of an extraction device of a closed flexible sachet.

In FIG. 1, the sachet 1 is disposed on the lower, or first, member having base 2 and support 4, the support 4 has a wall surface which extends laterally from the base 2 to a rim 24 (FIG. 1a) to define a first member cavity, and the sachet holder. The support comprises two diametrically opposite tightening lugs 3 adapted to engage on the tightening flanges 7 of the upper member 8.

The upper, or second, member 8 has a wall surface which extends to an edge 23 to define a second member cavity and comprises a water inlet 10 and pointed members 11 in order to perforate the upper surface of the sachet 1. The lower member base 2 has projecting portions 19 and flow holes 20.

In operation the sachet 1 is disposed on the lower member base 2 and by maintaining the support assembly 4, the lower member 2 and the sachet 1 by the handle 22, the tightening lugs 3 are engaged on the tightening flanges 7 of the upper member 8.

Figure 1A:
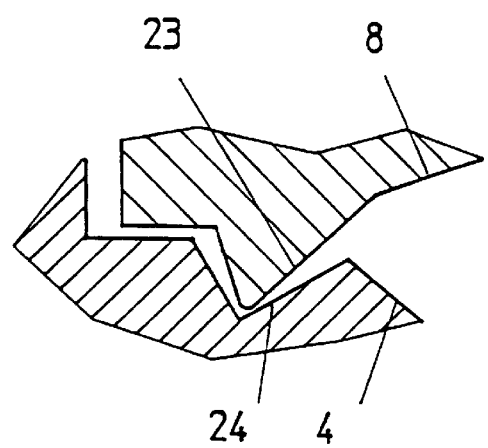
FIG. 1a is an enlarged view of part A of FIG. 1.

Fluid-tightness is ensured at in section "A" of FIG. 1, as further illustrated in FIG. 1a. The lower inner conical edge 23 of the upper member cooperates mates with the conical rim 24 of the lower member, thereby gripping the periphery of the sachet 1. The pointed members 11 pierce the sachet 1 and the hot water is supplied via the water inlet duct 10 and penetrates into the sachet 1. The pressure in the sachet increases and the lower surface of the sachet is forced against the projecting portions 19 until it tears on these projecting portions when it reaches its breaking tension. The extraction stage then commences. The coffee flows via the flow holes 20 and is collected under the bore 21 in a container (not shown).

FIGS. 2 and 3 show an upper member for the supply of water which differs from that of FIG. 1. This member is in two pieces. The portion 41 comprises a central water inlet 42, and a disc 43 bearing pointed members 44 is adapted to pierce the upper surface of the sachet to be extracted, this disc being adapted to be housed in the housing 45 of the portion 41. The bore 46 of the disc 43 is partially occupied by the pointed members 44, making it possible to allow the passage of water so that it penetrates into the sachet to be extracted. The disc 43 may rotate in its housing 45 and is held in place by a screw 48 (FIG. 3) disposed in the bore 47 of the disc 43.

An O-ring joint 49 is provided as well as a plurality of water inlet ducts 50 disposed on the periphery of the portion 41 so that during extraction the water pushes the joint downwards thus ensuring that the system is fluid-tight.

Figure 4:
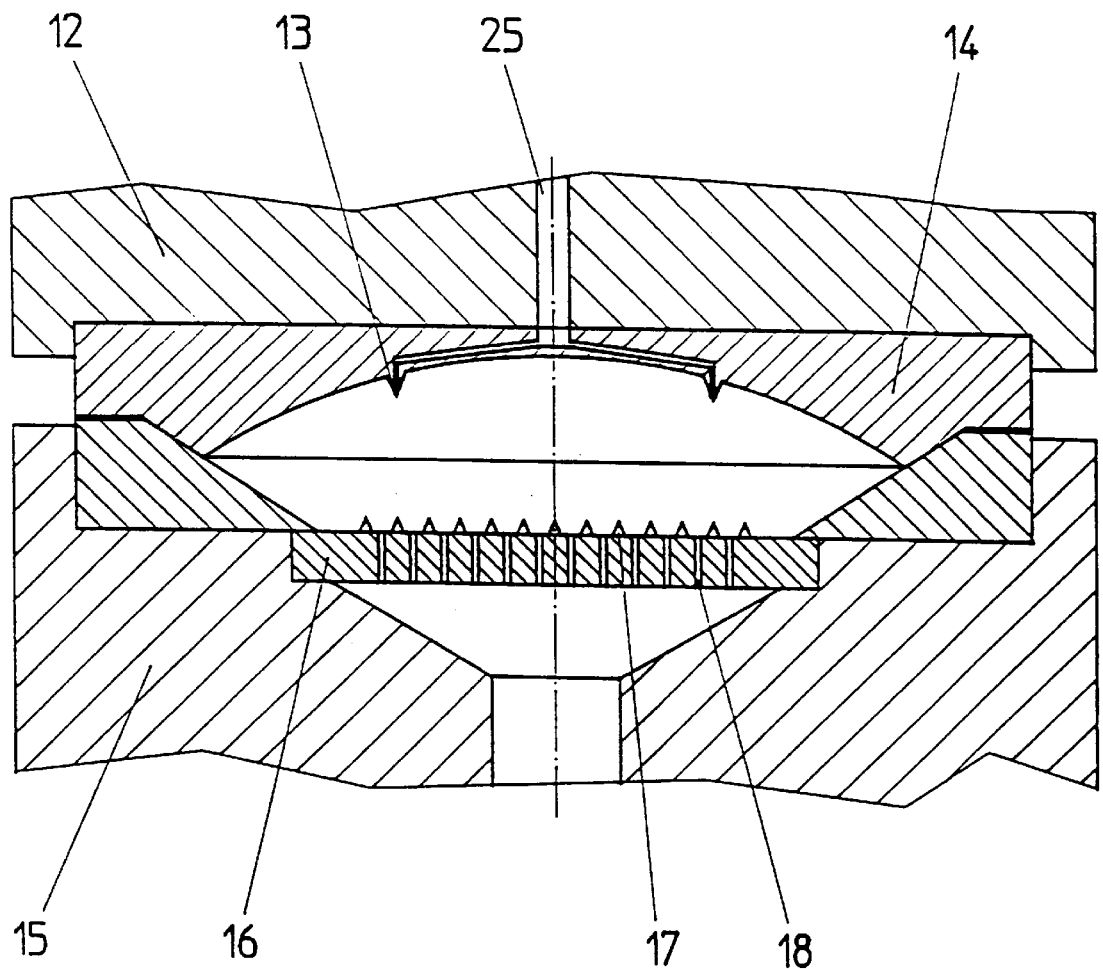
FIG. 4 is a partial diagrammatic view of an extraction device of a closed flexible sachet according to a second embodiment.

In FIG. 4, the extraction device comprises an upper member 12 having injection needles 13 disposed under the vault of the cavity. During clamping, the injection needles perforate the upper surface of the sachet enabling the subsequent introduction of extraction fluid supplied via the duct 25. This upper member has a projecting portion 14 of conical appearance. This projecting portion fits into a complementary cone 26 disposed in the lower support 15. As they fit into one another during the clamping of the members, these portions help to stretch the surfaces of the sachet and centre the powder substance.

The lower member 16 also has projecting portions 17 and flow holes 18 through which the coffee can flow.

FIG. 4 does not show the fastening system using the tightening lugs and flanges. The method of extraction is the same as for the device of FIG. 1.

Figure 5:
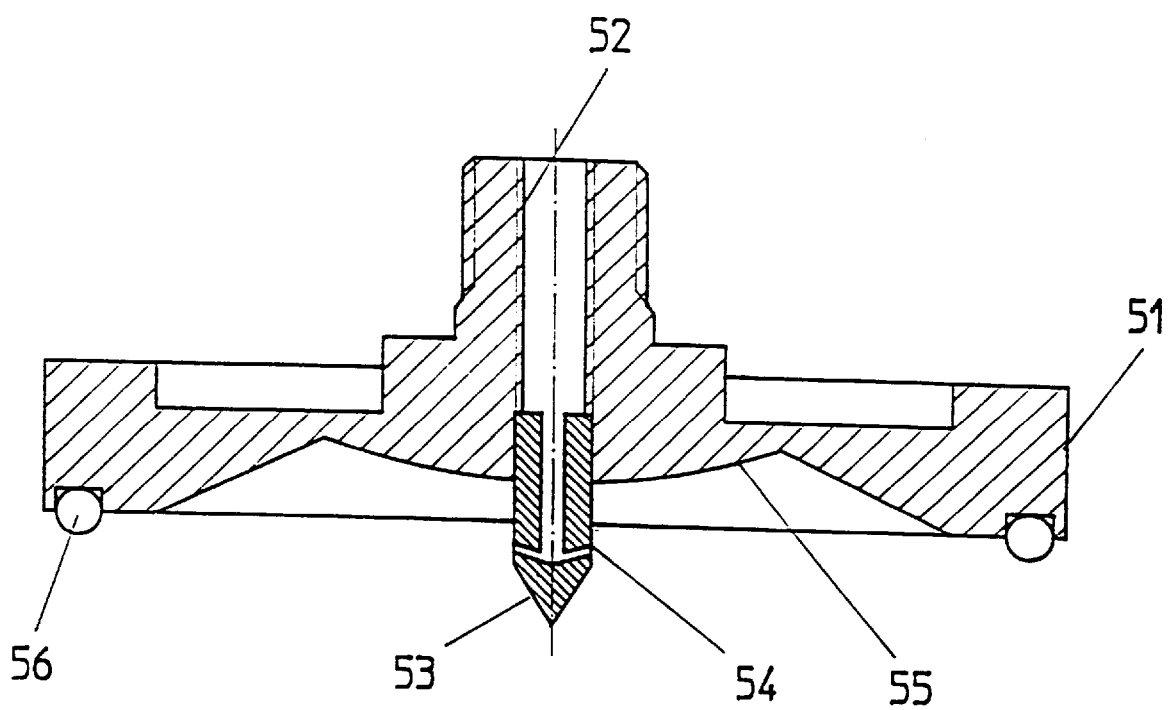
FIG. 5 is a diagrammatic view of the upper member for water injection according to a second embodiment.

FIG. 5 shows a further embodiment of the upper water injection member 51 comprising a water inlet 52 and a single pointed member 53 adapted to perforate the sachet, this pointed member comprising a bore 54 supplying water to the sachet. This member 51 comprises a concave zone 55 allowing an improved distribution of the water so that the upper surface of the sachet is forced against the concave zone. It also has an O-ring joint 56 to ensure fluid-tightness.

Figure 6:
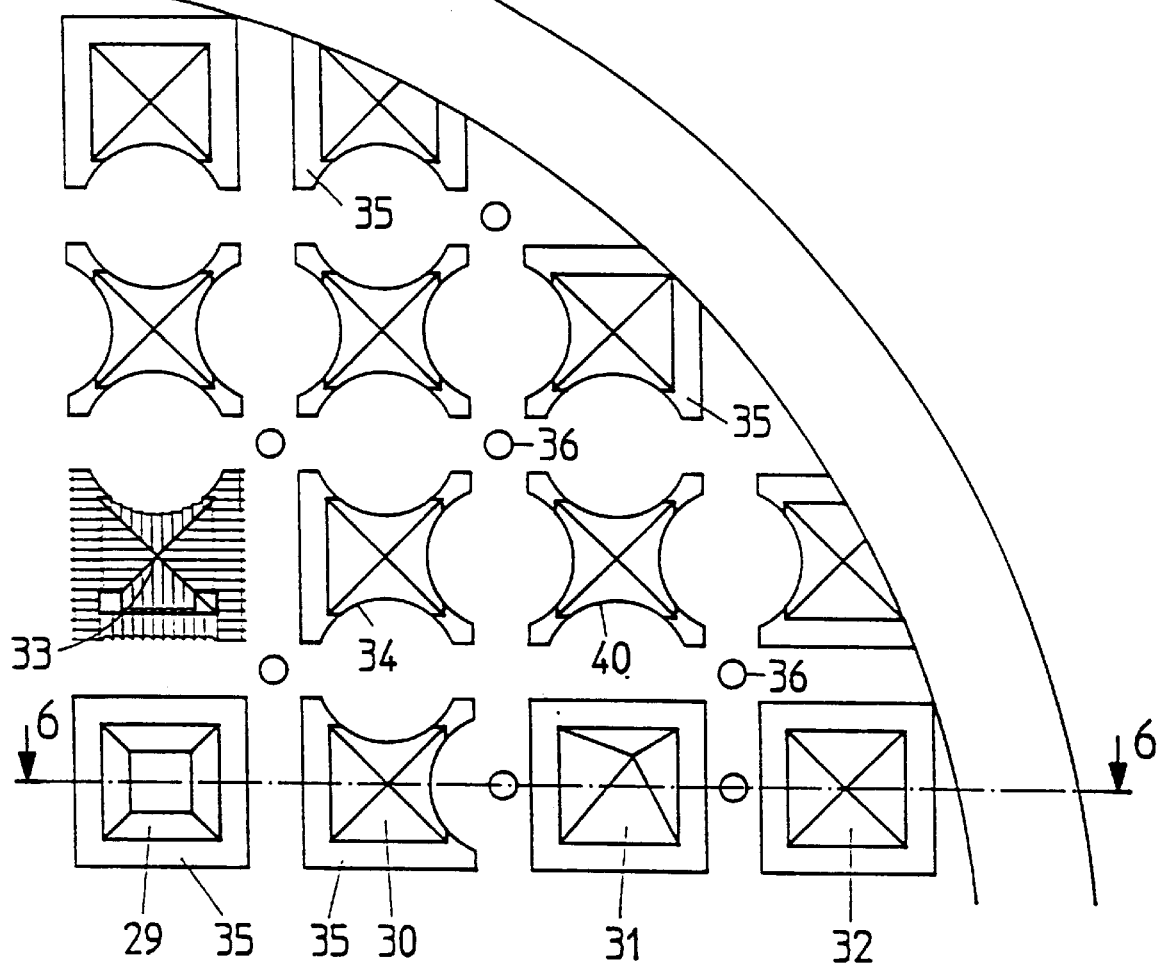
FIG. 6 is partial plan view of the lower member formed by raised and hollow portions and flow holes.
Figure 7:
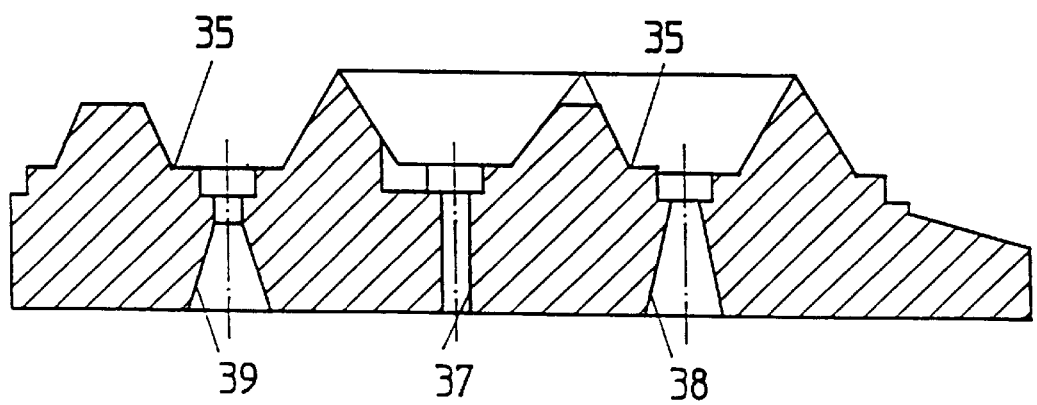
FIG. 7 is a section along the line 6—6 of FIG. 6.

FIG. 6 shows various types of raised pyramidal portions. These include truncated pyramids 29, pyramids 30 cut away on two sides, asymmetrical pyramids 31, symmetrical pyramids 32, pyramids 33 with corrugations, pyramids 34 cut away on three sides and pyramids 40 cut away on four sides. These pyramids all have terraces 35.

The flow holes 36 may be of three different shapes: cylindrical 37, flared downwards 38 or cylindrical and flared downwards 39.

The presence of terraces 35 makes it possible to control the opening (or tearing) of the lower surface of the sachet, making it possible to provide the sachet with a filter function.

Figure 8:
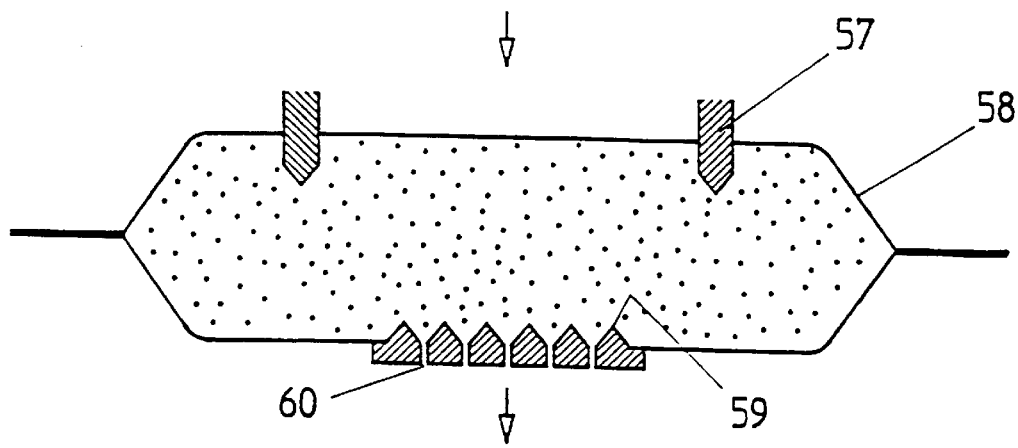
FIG. 8 is a diagrammatic view of the positioning of the water inlet members provided below the upper surface of the device and the raised members provided on the lower surface for the flow of the coffee extract.

FIG. 8 shows the members 57 for piercing the sachet 58 and the raised and hollow portions 59 disposed about the flow holes 60. This system is equivalent to that of FIGS. 1 and 4.

Figure 9:
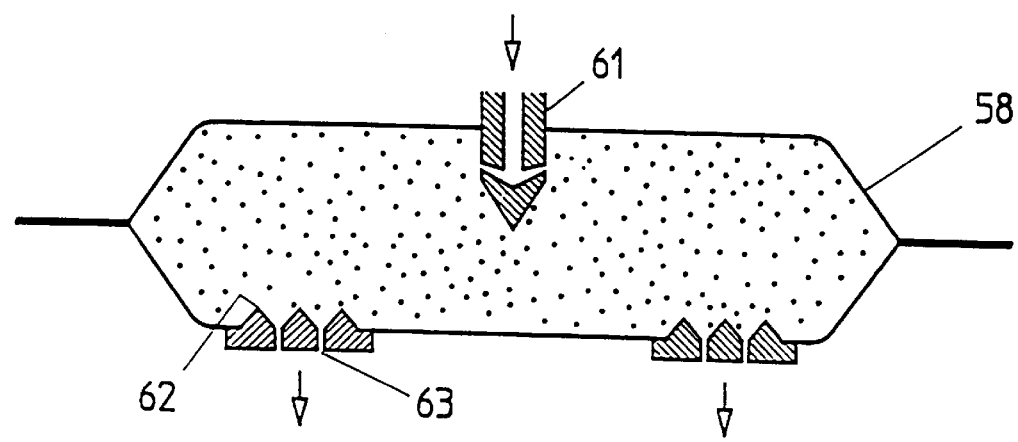
FIG. 9 is a diagrammatic view of the positioning of the water inlet members provided below the upper surface of the device and the raised members provided on the lower surface for the flow of the coffee extract, according to a second embodiment.

FIG. 9 shows the extraction of a sachet 58 with a single pointed member 61 and raised and hollow portions 62 and flow holes 63 disposed on the periphery of the sachet.

Figure 10:
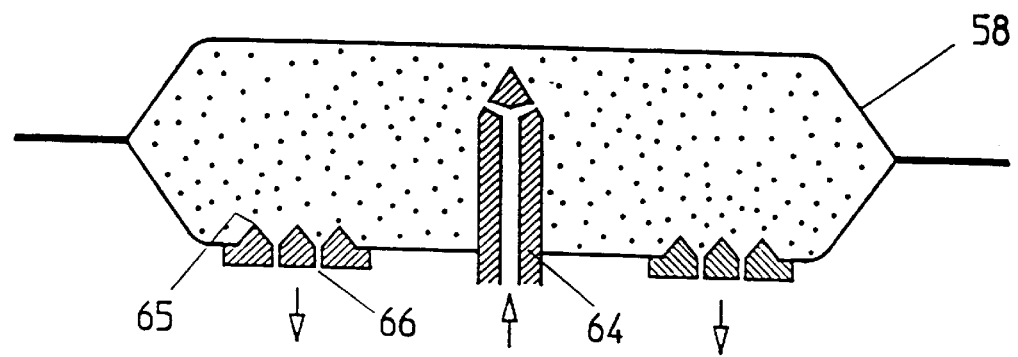
FIG. 10 is a diagrammatic view of the positioning of the water inlet and coffee extraction members, both provided on the lower surface of the device, according to a third embodiment.

Finally, FIG. 10 shows a single pointed member 64 for the upward supply of water and the coffee collection system on the same side comprising raised and hollow portions 65 about the flow holes 66.

Figure 11:
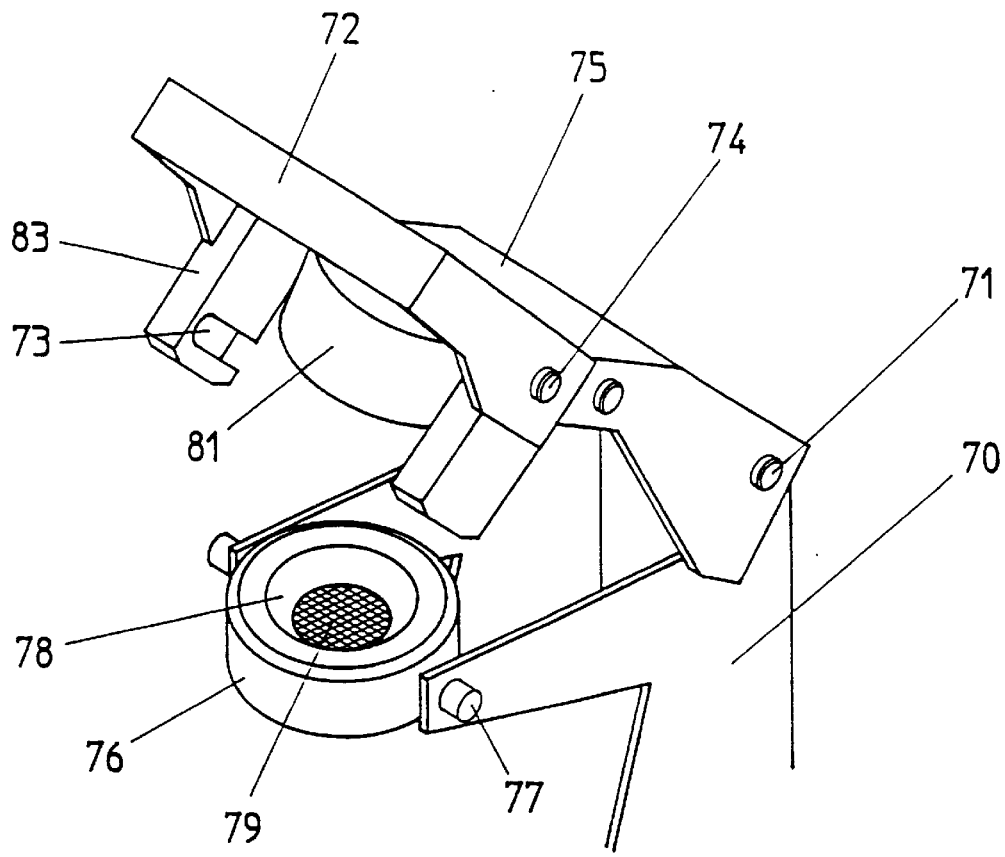
FIG. 11 is a diagrammatic perspective view of an extraction system of a closed flexible sachet, according to a third embodiment.
Figure 12:
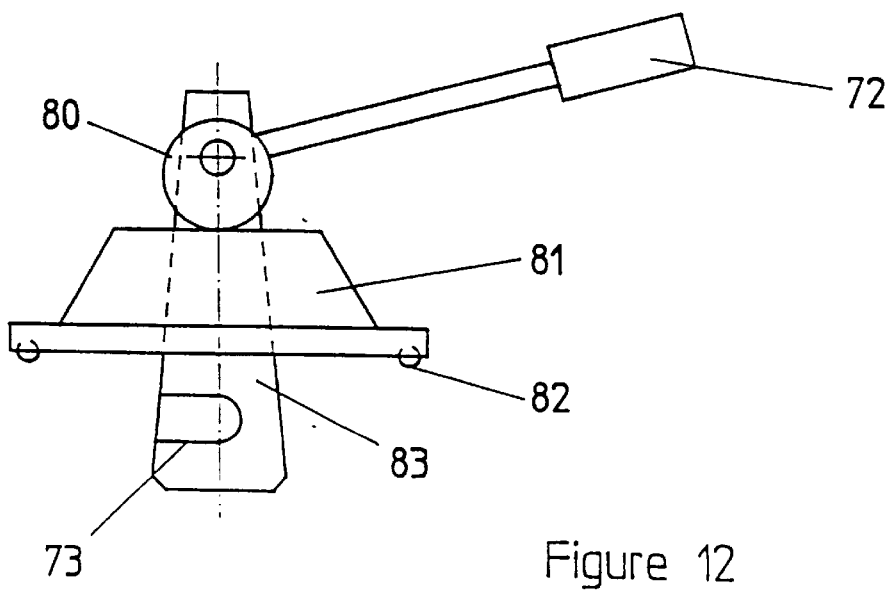
FIG. 12 is a diagrammatic view of the upper member of the extraction system of FIG. 11.

FIGS. 11 and 12 show an extraction system comprising a chassis 70 on which there is mounted to rotate along the rod 71 an arm 75 itself comprising a locking lever 72 with hooks 73 mounted on an arm 83, this lever being mounted to rotate along the rod 74. The arm 75 is closed on a lower portion 76 mounted to rotate along the rod 77 and comprising a housing 78 with raised and hollow portions 79 adapted to receive the sachet to be extracted.

In operation the sachet is placed in the housing 78, the arm 75 is lowered by pressing on the locking lever 72 until the hooks 73 are engaged on the rod 77.

A cam 80 makes it possible to clamp the upper water supply member 81 against the lower member 76 in order to ensure good fluid-tightness of the system by correct application on the joint 82. The sachet is extracted and the locking lever 72 is released in order to raise the arm 75. A means making it possible to pivot the lower member 76 so as to eject the sachet to a compartment provided in the chassis 70 is advantageously provided.

We claim:

1. An apparatus for extracting, with water under pressure, a comestible substance contained in a sachet package comprising:

a first member and a second member wherein
the first member comprises a base, a wall surface and a wall rim wherein the wall surface extends laterally from the base to the rim to define a first member cavity and wherein the base contains holes therethrough for flow of an extract from the cavity through the base and comprises a surface and raised portions wherein the raised portions extend from the base surface into the first member cavity for tearing a sachet sheet positioned adjacent and deformed under pressure against the raised portions;
the second member comprises a wall surface and an edge wherein the wall surface defines a second member cavity and extends to the edge; and
the first member and second member are configured so that upon bringing the first member rim and the second member edge together, the first and second member cavities form a chamber confined by the wall surfaces and base and each of the cavities define substantially one-half of the chamber for containing sheets of a sachet which extend to a sachet edge and contain a comestible substance for preparation of a beverage and so that the first member rim and the second member edge are configured to grip the sachet edge and to provide fluid-tightness and so that upon bringing the rim and edge together to grip the sachet edge and to provide fluid-tightness, the rim and edge stretch the sachet;

a chassis and chassis mounting affixed with the first member and second member so that the first and second members are mounted to the chassis about an axis so that movement of one member relative to the other is through a plane transverse to the axis and so that upon movement about the axis one member to the other, the first member rim and the second member edge are brought together to form the chamber, grip the sachet edge, provide fluid-tightness and stretch the sachet;

means which extend from the second member into the second member cavity for, upon the bringing of the first member rim and second member edge together, perforating a sheet of a sachet which contains a comestible substance for preparation of a beverage to obtain a perforated sachet and for introducing water for extracting the substance contained in the perforated sachet; and fastening means integral with each of the first and second members and comprising a lever which extends from one of the first and second members to the other member for, upon the first and second members being together, rigidly fastening the first and second members together to form the chamber, grip the sachet edge, provide fluid-tightness and stretch the sachet.

2. An apparatus according to claim 1 wherein one of the first member rim and the second member edge has a conical concave form and the other has a conical convex form suitable for mating.

3. An apparatus according to claim 2 wherein an angle of conicity of the convex form is different from an angle of conicity of the concave form to limit contact of the conical forms.

4. An apparatus according to claim 1 wherein the second member comprises two pieces wherein a first piece forms a centrally disposed portion of the second member wall surface and wherein the first piece contains a plurality of bores which extend therethrough and open into the second member cavity and wherein the means for perforating a sheet are a plurality of members which extend from the first piece to pointed ends positioned in the second member cavity so that each pointed end member occupies a portion of each bore and so that another portion of each bore is open to passage of water.

5. An apparatus according to claim 1 or 4 wherein the second member edge has an outer wall portion and a portion recessed from the outer wall portion and further comprising a flexible joint member positioned adjacent the outer wall portion and the recessed portion.

6. An apparatus according to claim 5 wherein the joint member has a shape selected from the group consisting of a toric shape and a cylindrical shape.

7. An apparatus according to claim 1 wherein the second member edge has two portions which form a recess having an obtuse angle.

8. An apparatus according to claim 1 wherein the first member rim and the second member edge each have a corrugated form.

9. An apparatus according to claim 1 wherein the second member wall surface has a centrally disposed convex portion and an adjacent portion which is concave.

10. An apparatus according to claim 9 wherein the means for perforating a sheet of a sachet for introducing water is an injector member which extends through the centrally disposed convex portion into the second member cavity.

11. An apparatus according to claim 1 wherein a plurality of flow holes are positioned adjacent each raised portion of the base.

12. An apparatus according to claim 1 wherein the raised portions have a shape selected from the group consisting of cylinders, truncated cones, prisms, pyramids, truncated pyramids and asymmetric pyramids.

13. An apparatus according to claim 1 wherein the raised portions have a shape of terraced pyramids.

14. An apparatus according to claim 13 wherein the terraced pyramids extend from a pyramid base to a terrace for a distance of approximately from 0.3 mm to 1.8 mm, the terrace has a width of from 0.2 mm to 1 mm and the pyramid bases are spaced to provide channels having a width of approximately from 0.7 mm to 2.5 mm.

15. An apparatus according to claim 1 wherein the raised portions have a shape of truncated pyramids which have a height of from 1 mm to 7 mm and sides having a width of from 1 mm to 7 mm to provide surfaces having an angle with respect to a pyramid base of from 10° to 30°.

16. An apparatus according to claim 1 wherein the raised portions have a shape of an asymmetric pyramid.

17. An apparatus for extracting, with water under pressure, a comestible substance and comprising:

a first member comprising a base, a wall surface and a wall rim wherein the wall surface extends laterally from the base to the rim to define a first member cavity and comprising a water injector delivery member which extends laterally from the base and into the cavity and terminates in an end suitable for piercing a sheet of material of a package containing a substance for preparation of a beverage and for delivering water under pressure within the package and wherein the base contains holes therethrough for flow of an extract from the cavity through the base and comprises a surface and raised portions wherein the raised portions extend from the base surface into the cavity to a position at a distance from the base surface which is less than a distance of the injector member end from the base surface for, upon introducing water via the injector member under pressure into an injector member pierced package and placing the sheet under pressure so that the sheet deforms, contacting the sheet so that the sheet under pressure deforms against the raised portions for tearing the sheet;

a second member having a wall surface which defines a second member cavity and which extends to an edge suitable for cooperating with the first member rim to grip a package edge and provide fluid-tightness; and means for rigidly fastening the first and second members together to grip the package edge and provide fluid-tightness.

* * * * *

UNITED STATES PATENT AND TRADEMARK OFFICE
CERTIFICATE OF CORRECTION

PATENT NO. : 5, 826, 492

DATED : October 27, 1998

INVENTOR(S) : Olivier FOND, *et al.*

It is certified that error appears in the above-identified patent and that said Letters Patent is hereby corrected as shown below:

Column 1, line 8, delete "472." and insert therefor -- 472, which is a National Stage Application of PCT International Patent Application PCT/CH93/00180 deposited July 12, 1993. --.

Column 10, in <u>each</u> of lines 24 and 63, delete "INVENTION" and insert therefor -- DRAWINGS --.

Column 10, line 65, delete "the" and insert therefor -- forming the sachet holder. The --.

Column 10, line 67, to column 11, line 1, delete "sachet holder. The".

UNITED STATES PATENT AND TRADEMARK OFFICE
CERTIFICATE OF CORRECTION

PATENT NO. : 5,826,492
DATED : October 27, 1998
INVENTOR(S) : Olivier FOND, et. al.

It is certified that error appears in the above-identified patent and that said Letters Patent is hereby corrected as shown below:

Column 11, line 16, after "cooperates", insert --and--.

Signed and Sealed this

Fourth Day of April, 2000

Attest:

Q. TODD DICKINSON

*Attesting Officer*  *Director of Patents and Trademarks*